(12) United States Patent
Varma et al.

(10) Patent No.: US 8,015,131 B2
(45) Date of Patent: Sep. 6, 2011

(54) LEARNING TRADEOFFS BETWEEN DISCRIMINATIVE POWER AND INVARIANCE OF CLASSIFIERS

(75) Inventors: Manik Varma, Bangalore (IN); Debajyoti Ray, London (GB)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 12/062,818

(22) Filed: Apr. 4, 2008

(65) Prior Publication Data

US 2009/0099986 A1    Apr. 16, 2009

(30) Foreign Application Priority Data

Oct. 12, 2007   (IN) .............................. 2149/DEL/2007

(51) Int. Cl.
*G06E 1/00* (2006.01)
*G06E 3/00* (2006.01)
*G06F 15/18* (2006.01)
*G06G 7/00* (2006.01)

(52) U.S. Cl. ......................................................... 706/20
(58) Field of Classification Search .................. None
See application file for complete search history.

(56) References Cited

U.S. PATENT DOCUMENTS

| | | | |
|---|---|---|---|
| 6,112,195 A | 8/2000 | Burges | |
| 6,996,549 B2 | 2/2006 | Zhang et al. | |
| 7,162,085 B2 | 1/2007 | Kato et al. | |
| 7,167,849 B2 | 1/2007 | Graepel et al. | |
| 2003/0037016 A1 | 2/2003 | Vilalta et al. | |
| 2003/0158830 A1 | 8/2003 | Kowalczyk et al. | |
| 2004/0111453 A1 | 6/2004 | Harris et al. | |
| 2004/0165767 A1 | 8/2004 | Gokturk et al. | |
| 2004/0179719 A1 | 9/2004 | Chen et al. | |
| 2004/0252889 A1 | 12/2004 | Liu et al. | |
| 2005/0058338 A1 | 3/2005 | Krishnan et al. | |
| 2005/0177040 A1 | 8/2005 | Fung et al. | |
| 2005/0206363 A1* | 9/2005 | Ho et al. ..................... 324/76.22 | |
| 2005/0238200 A1 | 10/2005 | Gupta et al. | |
| 2006/0050985 A1 | 3/2006 | Hardy et al. | |
| 2006/0074834 A1 | 4/2006 | Dong et al. | |
| 2006/0112026 A1* | 5/2006 | Graf et al. ....................... 706/14 | |

FOREIGN PATENT DOCUMENTS

WO    WO-2007004864    1/2007

OTHER PUBLICATIONS

Vedaldi, 'Multiple kernels for object detection': 2009, IEEE,978-1-4244-4419, pp. 606-613.*

(Continued)

*Primary Examiner* — Omar Fernandez Rivas
*Assistant Examiner* — Peter Coughlan
(74) *Attorney, Agent, or Firm* — Perkins Coie LLP

(57) ABSTRACT

Systems and methods are described for learning the discriminative power-invariance tradeoffs for classification of input data ("tradeoff learning system"). In various embodiments, the tradeoff learning system receives multiple classifiers ("base classifiers") and employs a learning technique to produce a combined classifier. Each received base classifier achieves a different level of tradeoff. The learning technique then decreases a function of kernel weights associated with each of the received classifiers to produce the combined classifier. By decreasing the function of kernel weights, the tradeoff learning system computes a combined classifier that classifies input data more accurately than the received multiple classifiers.

17 Claims, 7 Drawing Sheets

OTHER PUBLICATIONS

Varma, 'More generality in efficient multiple kernel learning': 2009, $26^{th}$ International conference on machine learning, pp. 1065-1072.*

Varma, 'Learning the discriminative power-invariance trade-off': 2007, IEEE, 978-1-4244-1631.*

Csurka, G. et al., "Visual Categorization with Bags of Keypoints," European Conference on Computer Vision ECCV, 2004, 16 pages.

Edelman, S., "Class Similarity and Viewpoint Invariance in the Recognition of 3D Objects," Biological Cybernetics, 1995, pp. 1-34.

Eichorn, J. et al., "Object Categorization with SVM: Kernels for Local Features," Max Planck Institute for Biological Cybernetics, Technical Report No. 137, Jul. 2004, 9 pages.

Mikolajczyk, K., et al., "A Performance Evaluation of Local Descriptors," IEEE Transactions on Pattern and Machine Intelligence, 2005, pp. 1-7.

Shi, X. et al., "On Rotational Invariance for Texture Recognition," 4th International Workshop on Texture Analysis and Synthesis, 2005, 6 pages.

Varma, M. et al., "Locally Invariant Fractal Features for Statistical Texture Classification," Computer Vision, ICCV 2007, pp. 1-8.

Winder, S. et al., "Learning Local Image Descriptors," Computer Vision and Pattern Recognition, CVPR 2007, 8 pages.

Zhang, H. et al., "Learning a Discriminative Classifier Using Shape Context Distances," Computer Vision and Pattern Recognition, CVPR 2003, 6 pages.

* cited by examiner

US 8,015,131 B2

LEARNING TRADEOFFS BETWEEN DISCRIMINATIVE POWER AND INVARIANCE OF CLASSIFIERS

CROSS REFERENCE TO RELATED APPLICATION

This application claims the benefit of Indian Application No. 2149/DEL/2007, filed on Oct. 12, 2007, entitled "LEARNING TRADEOFFS BETWEEN DISCRIMINATIVE POWER AND INVARIANCE OF CLASSIFIERS," which is hereby incorporated herein in its entirety by reference.

BACKGROUND

A classifier is a function that classifies inputs by computing a function on a set of inputs. Classifiers are generally computed from a set of learning data and then employed to classify input data. Many practical applications employ classifiers, including pattern recognition, regression estimation, "SPAM" detection, intrusion detection, and so forth. Classifiers can be used to determine, for example, whether an image contains a particular type of object, such as a chair.

A support vector machine (SVM) is a type of classifier. An SVM operates by identifying a hyper-surface in a space of possible inputs by analyzing training data. The hyper-surface attempts to divide "positive" examples in the space of possible inputs from "negative" examples by maximizing the distance ("Euclidian distance") between the nearest of the positive and negative examples to the hyper-surface. An input is classified as positive or negative depending on which side of the hyper-surface the classifier places the input.

Multiple classifiers can be designed or "learned" to classify data, and these classifiers can be distinguished from one another based on the tradeoff they achieve between discriminative power and invariance. Discriminative power is a measure of a capability to distinguish between types of inputs, e.g., chairs in images. Invariance is a measure of a capability to distinguish between attributes of the inputs, e.g., rotation, zoom, color, and so forth. As examples, image patches, when compared using standard Euclidean distance, have almost no invariance but very high discriminative power because a classifier can compare image patches pixel-by-pixel to determine whether there is a match, but it cannot resolve attributes of the input (e.g., rotation). Alternatively, a constant function has very high invariance but no discriminative power because a classifier employing the function can compute the result of the constant function to classify an input, but different types of objects may not be adequately defined by the constant function.

Classifiers are often generated between these two extremes of discriminative power and invariance, and the concomitant tradeoff affects the generalization performance of classifiers. However, this tradeoff often varies according to the specific classification task at hand. As an example, if all objects in images are known to be chairs of a certain design but in various positions, discriminative power can be traded off to improve invariance. As another example, when classifying digits, a rotationally invariant classifier may not be desirable because then a "6" could be mistaken for a "9." If the task was simplified to distinguish between just "4" and "9," then it would be preferable to have full rotational invariance if the digits could occur at any arbitrary orientation. However, "4" and "9" can be confused during image classification. If a rich training corpus of training data is available with digits present at various different orientations, then a more discriminative and less invariant classifier can be employed to classify input data. In this scenario, the data itself would provide the rotation invariance. When multiple classifiers are available to classify data, it can be difficult to decide how to automatically combine the classifiers to provide accurate classification.

SUMMARY

Systems and methods are described for learning the discriminative power-invariance tradeoffs for classification of input data ("tradeoff learning system"). In various embodiments, the tradeoff learning system receives multiple classifiers ("base classifiers") and employs a learning technique to produce a combined classifier. Each received base classifier achieves a different level of tradeoff. The learning technique then decreases a function of kernel weights associated with each of the received classifiers to produce the combined classifier. By decreasing the function of kernel weights, the tradeoff learning system computes a combined classifier that classifies input data more accurately than the received multiple classifiers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
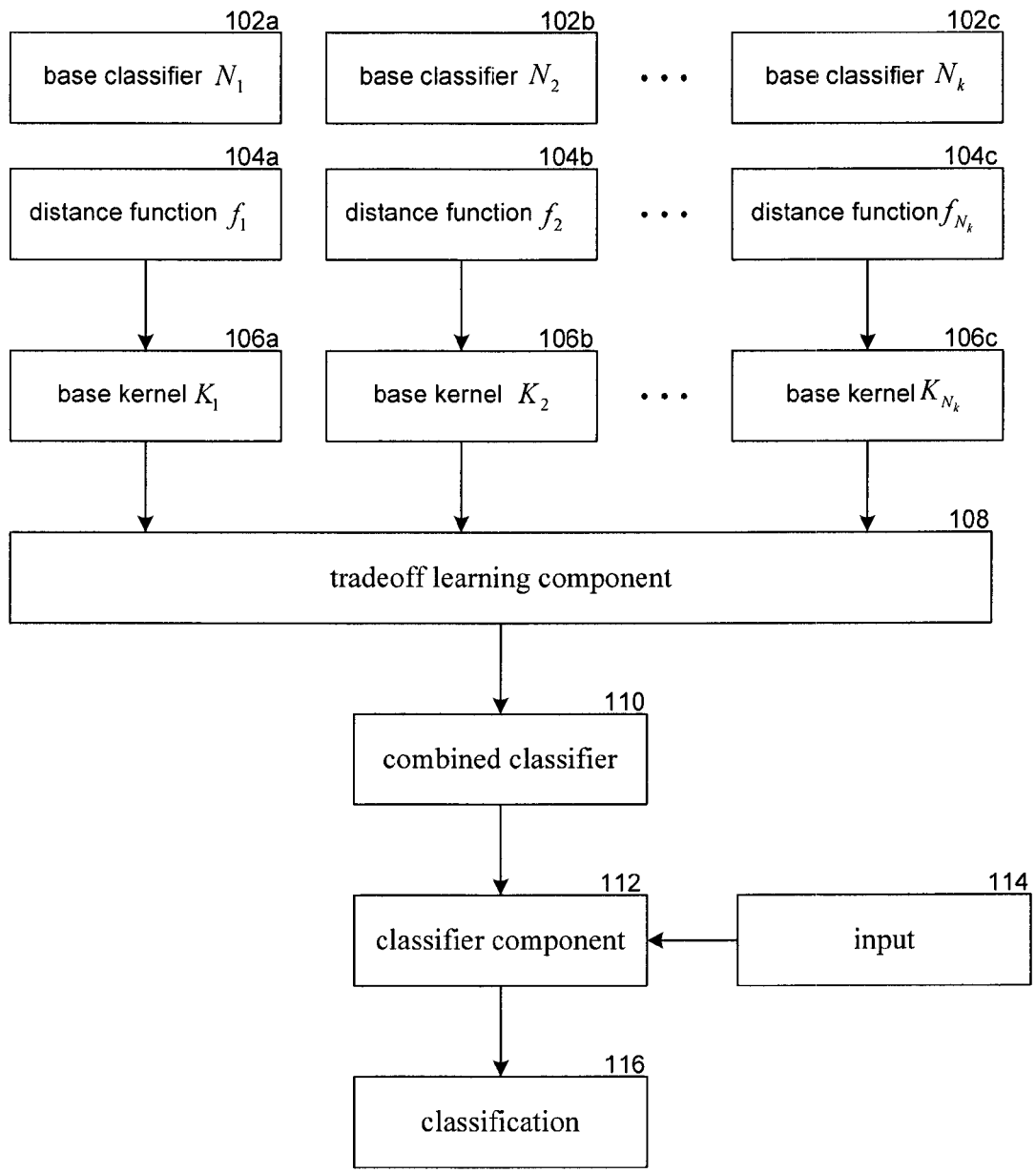
FIG. 1 is a block diagram illustrating components of the tradeoff learning system in various embodiments.

Systems and methods are described for learning the discriminative power-invariance tradeoffs for classification of input data ("tradeoff learning system"). In various embodiments, the tradeoff learning system receives multiple classifiers ("base classifiers") and employs a learning technique to produce a combined classifier. Each received base classifier achieves a different level of tradeoff. The learning technique then decreases a function of kernel weights associated with each of the received classifiers to produce the combined classifier. A kernel is a description of an attribute of a classifier that is expressed mathematically. A classifier can have multiple attributes and thus can have multiple kernels. An attribute is a variable that can be described by data that is input to be classified. Each kernel can have an associated kernel weight that indicates the relative contribution of the kernel. The tradeoff learning system decreases the kernel weights subject to preferences indicated by a user. For example, the user can indicate that some attributes are more important than others by providing preference weights. By decreasing the function of kernel weights, the tradeoff learning system computes a combined classifier that classifies input data more accurately than the received multiple classifiers.

Returning to the example of classifying "4" versus "9," if rotated copies of both digits were present in the training set, then rotationally invariant classifiers could be suited to this task. However, if some of the rotated digits were scaled so as to cause classifiers to confuse these digits, it may be preferable to employ similarity or affine invariant classifiers. However, doing so could lead to even poorer classification performance because such classifiers could have lower discriminative power than purely rotationally invariant classifiers. Determining the exact level of invariance by visual inspection alone would be challenging in such a scenario.

In some embodiments, the tradeoff learning system combines the rotationally invariant classifier with a scale (or similarity or affine) invariant classifier. The combined classifier would have neither invariance in full. As a result, the distance between a digit and its rotated copy would no longer be zero but would still be sufficiently small. Similarly, small scale changes would lead to increased, small (nonzero) distances. However, the combined distance can also be increased by a sufficient margin to ensure good classification. In such embodiments, the tradeoff learning system determines the proportion in which the "base" classifiers should be combined to achieve a good tradeoff between reduced invariance and heightened discriminative power.

In various embodiments, rather than explicitly building a combined classifier, the tradeoff learning system can learn a combined kernel distance function. The tradeoff learning system can start with base classifiers that achieve different levels of the discriminative power-invariance tradeoff (e.g., no invariance, rotation invariance, affine invariance, illumination invariance, etc.) These classifiers can be classifiers obtained by visual inspection or conventional classifiers. Each of these base classifiers and its associated distance function can be used to generate a base kernel. The tradeoff learning system can then select a kernel to be a linear combination of base kernels that minimizes the hinge loss on the training set subject to regularization. This leads to a convex optimization problem with a linear objective and quadratic inequality constraints that can be solved efficiently by off-the-shelf packages (e.g., SeDuMi). The learned base kernel weights indicate the discriminative power-invariance tradeoff, whereas the learned kernel can lead to superior classification as compared to the base kernels. The tradeoff learning system learns a kernel by combining base classifiers under an explicit classification cost function, thereby resulting in real-valued weights that achieve the required tradeoff.

The framework the tradeoff learning system employs is general and places almost no restrictions on the base classifiers. Thus, the combined classifiers can be used to either gain knowledge about the tradeoff level or learn a superior kernel for a variety of classification tasks. The framework can also be used even when the features are heterogeneous, as in the case of combining shape, color, and texture cues. An ideal color classifier should have very high color discriminative power but should be invariant to transformations in the object's shape or texture. The framework can be used to learn the tradeoffs between such features.

Learning the Tradeoff

The tradeoff learning system starts with $N_k$ base classifiers and associated distance functions $f_1, \ldots, f_{N_k}$. Each classifier achieves a different tradeoff between discriminative power and invariance on the specified task. The classifiers and distance functions are then "kernelized" to yield base kernels $K_1, \ldots, K_{N_k}$. There are many ways of converting distances to inner products, and the tradeoff learning system can employ any of them. It then sets $K_k(x,y)=\exp(-\gamma_k f_k(x,y))$ with the kernel matrices being positive semi-definite.

The tradeoff learning system can select a kernel for a specified task as a linear combination of base kernels: $K_{opt}=\Sigma_k d_k K_k$.

To learn the tradeoff, the tradeoff learning system can optimize base kernel weights in an SVM framework so as to achieve the best classification on the training set, subject to regularization. In some embodiments, the tradeoff learning system employs the following primal cost function:

$$\underset{w,d,\xi}{\text{Minimize}} \quad \frac{1}{2}w^t w + C1^t \xi + \sigma^t d \qquad (1)$$

$$\text{subject to } y_i(w^t \phi(x_i) + b) \geq 1 - \xi_i \qquad (2)$$

$$\xi \geq 0, d \geq 0, Ad \geq p \qquad (3)$$

$$\text{where } \phi^t(x_i)\phi(x_j) = \sum_k d_k \phi_k^t(x_i)\phi_k(x_j) \qquad (4)$$

Equation (1) is the objective function. In that equation, w is a matrix representing the normal to the support hyper-surface. C is a misclassification penalty scalar value. $\xi$ is the misclassification distance and is zero when an input is correctly classified or nonzero when incorrectly classified. $\sigma$ is a preference weight specified by a user for an attribute. $d_k$ is the weight for each feature or attribute k. Given the misclassification penalty C, the objective function maximizes the margin while minimizing the hinge loss on the training set $\{(x_i, y_i)\}$. An $l_1$ regularization on the weights $d_k$ enables the tradeoff learning system to determine a minimal set of invariances. The tradeoff learning system decreases most of the weights to zero depending on the parameters $\sigma_k$ that encode prior preferences for classifiers. The $l_1$ regularization thus prevents overfitting if many base kernels are included since only a few will end up being used. The tradeoff learning system can decrease or minimize the quantity $$\frac{1}{2}w^t w$$

by increasing the weights and letting the support vectors tend to zero. The regularization prevents this from happening and therefore prevents the weights from becoming too large.

The constraints are also similar to the standard SVM formulation. The tradeoff learning system can incorporate at least three additional constraints. The first, $d_k \geq 0$, ensures that the weights are interpretable and also leads to a more efficient optimization problem. The second, $Ad \geq p$, with some restrictions, enables the tradeoff learning system to encode prior knowledge about the problem. The final constraint, formula (4), is a restatement of $K_{opt}=\Sigma_k d_k K_k$ using the nonlinear embedding $\phi$. Other constraints can also be introduced.

As in the regular SVM formulation, the primal variables may not be solved for directly since w is infinite dimensional and $\phi$ is unspecified. The solution is obtained by moving to a dual formulation. First, the Lagrangian is formed by adding the constraints to the objective. Next, for the given problem, the order of first maximizing with respect to the Lagrange multipliers and then minimizing with respect to the primal variables can be switched. This leads to the following simplified dual formulation:

$$\underset{\alpha, \delta}{\text{Maximize}} \quad 1^t \alpha + p^t \delta \quad (5)$$

$$\text{subject to } 0 \leq \delta, 0 \leq \alpha \leq C, 1^t Y\alpha = 0 \quad (6)$$

$$\frac{1}{2} \alpha^t Y K_k Y \alpha \leq \sigma_k - \delta^t A_k \quad (7)$$

where $\alpha$ corresponds to the support vectors, Y is a diagonal matrix with the labels on the diagonal, 1 is a vector of ones and $A_k$ is the k th column of A.

The dual objective is linear while the constraints are quadratic inequalities. This is a special case of quadratically constrained quadratic programming and can be efficiently solved by off-the-shelf numerical optimization packages (e.g., SeDuMi).

Once the optimal weights and the support vectors of the optimal kernel have been solved, a novel point x can now be classified as ±1 by determining sign($\Sigma_i \alpha_i y_i K_{opt}(x,x_i)$). To handle an $N_c$ class problem, the task is divided into pairwise binary classification problems. The tradeoff learning system then classifies the novel point by taking the majority vote of all the $N_c(N_c-1)/2$ learned classifiers.

To summarize, kernel weights are learned corresponding to the discriminative power-invariance tradeoff for every pairwise classification task. A minimal set of invariances is learned for each pairwise task due to the $l_1$ regularization of the weights. However, a multi-class problem might still use all the classifiers. Given the weights, the tradeoff learning system can form the optimal kernel matrix and use it directly for classification.

Several embodiments of the facility will now be described in more detail with reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the inter-network remote control system. In addition, the data structures and message structures may be stored or transmitted via a data transmission medium, such as a signal on a communications link. Various communications links may be used, such as the Internet, a local area network, a wide area network, a wireless network, or a point-to-point dial-up connection.

In various embodiments, the hardware devices described herein can be implemented as software components and vice versa. In various embodiments, functionality described as being performed by a particular device or component can instead (or additionally) be performed by a different device or component.

FIG. 1 is a block diagram illustrating components of the tradeoff learning system in various embodiments. The tradeoff learning system includes multiple base classifiers 102a, 102b, and 102c. These classifiers can be SVMs or other types of classifiers in various embodiments. Each classifier is associated with a distance function. As examples, base classifier 102a is associated with distance function 104a, base classifier 102b is associated with distance function 104b, and base classifier 102c is associated with distance function 104c. The tradeoff learning system "kernelizes" the base descriptors and their associated distance functions to generate base kernels, such as base kernels 106a, 106b, and 106c. A tradeoff learning component 108 employs these base kernels to produce a combined classifier 110 using a learning technique. A classifier component 112 can then employ the combined classifier 110 to classify input 114 to produce a classification 116. The classification 116 is classified to be on one side of a hyper-surface.

Figure 2:
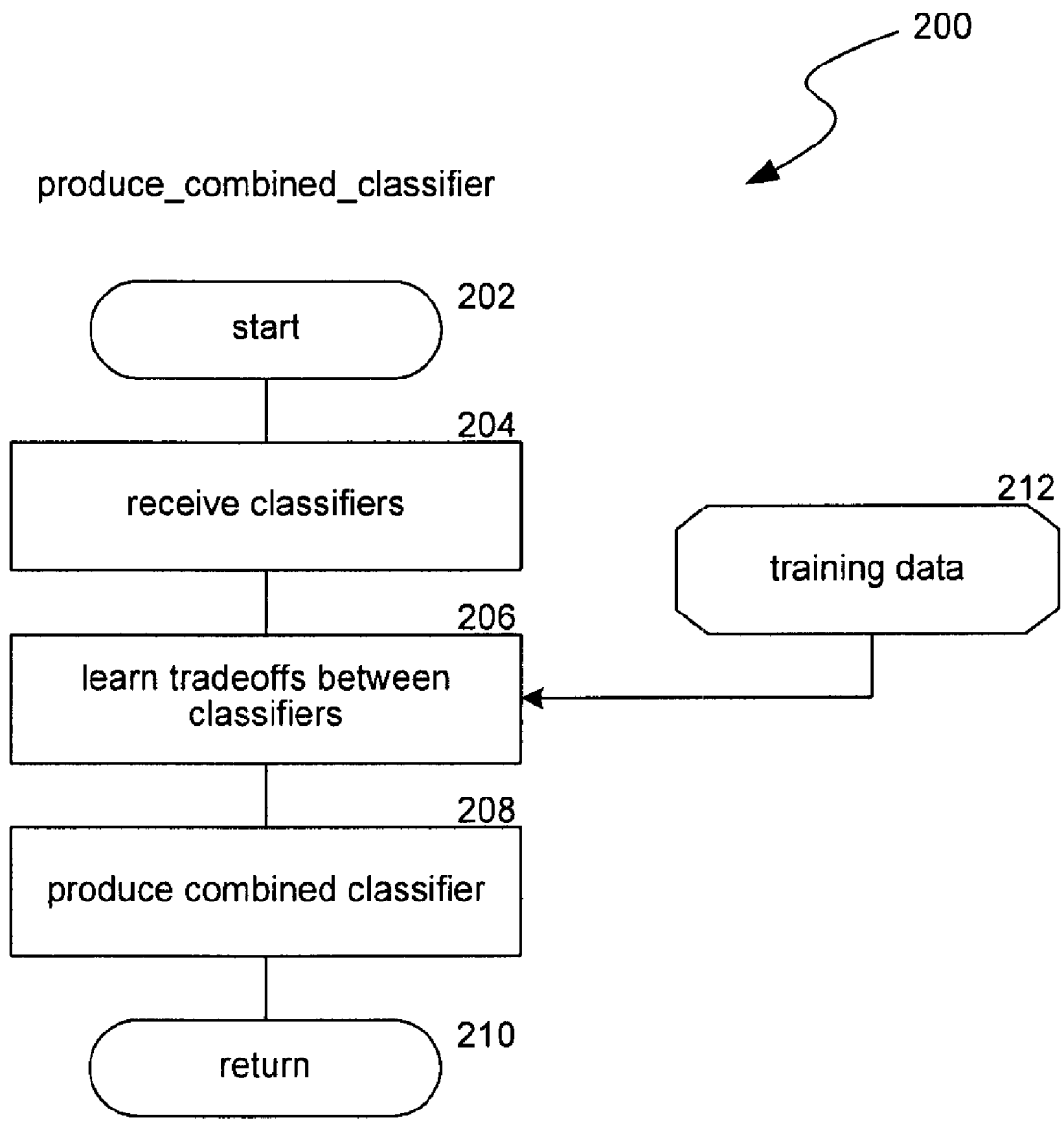
FIG. 2 is a flow diagram illustrating a produce_combined_classifier routine invoked by the tradeoff learning system in some embodiments.

FIG. 2 is a flow diagram illustrating a produce_combined_classifier routine invoked by the tradeoff learning system in some embodiments. The tradeoff learning system can invoke the routine to produce a combined classifier. The routine 200 starts at block 202. At block 204, the routine can receive multiple base classifiers. At block 206, the routine determines (or "learns") tradeoffs between the received classifiers. In various embodiments, the routine may analyze the training data 212 while analyzing the received classifiers, such as to determine how well each classifier already performs. In some embodiments, this training data may be employed to set preference weights for classifier attributes. At block 208, the routine produces a combined classifier. The mechanism the tradeoff learning system employs to produce a combined classifier is described in further detail below. At block 210, the routine returns.

Those skilled in the art will appreciate that the logic illustrated in FIG. 2 and described above, and in each of the flow diagrams discussed below, may be altered in a variety of ways. For example, the order of the logic may be rearranged, substeps may be performed in parallel, illustrated logic may be omitted, other logic may be included, etc.

Figure 3:
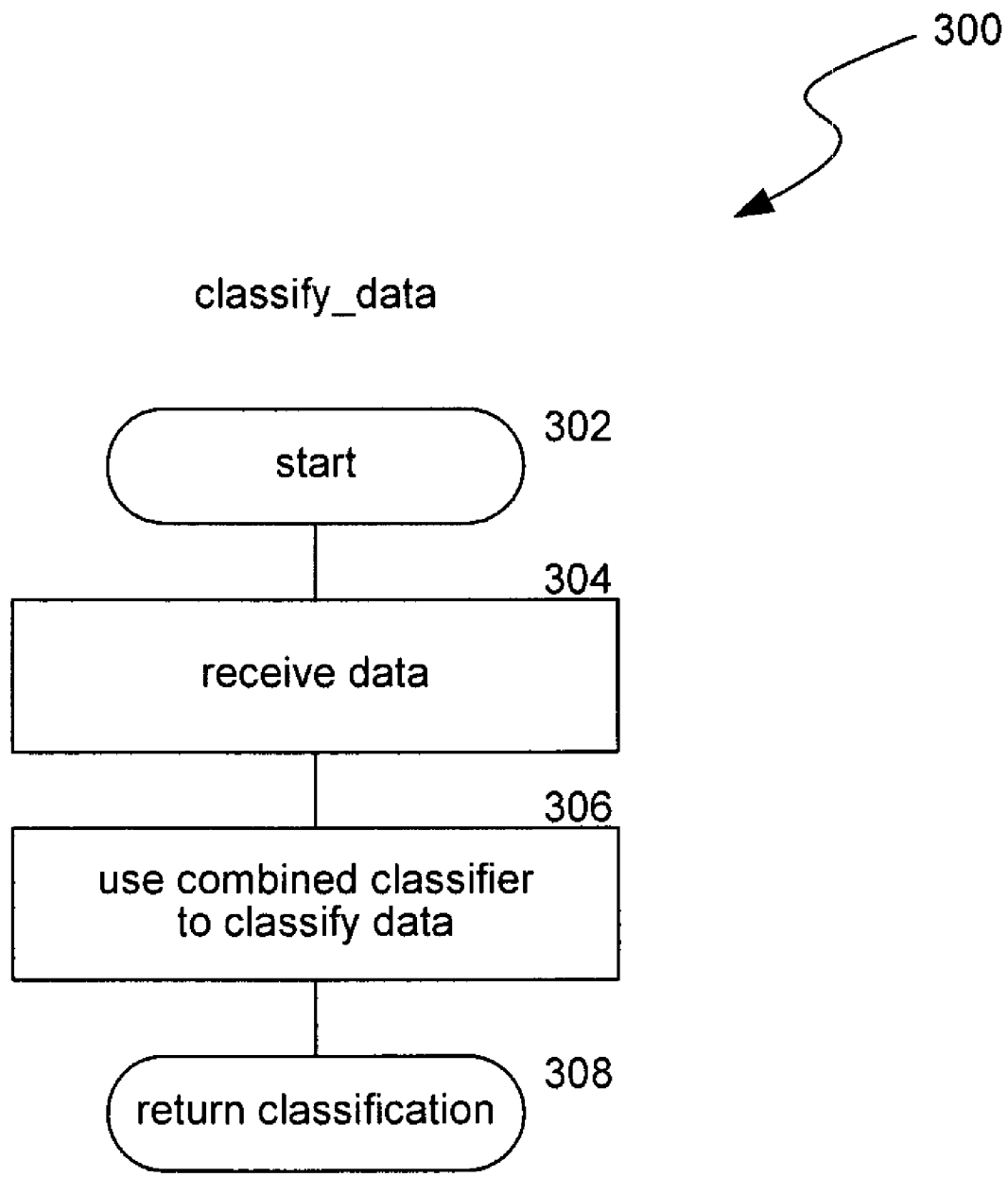
FIG. 3 is a flow diagram illustrating a classify_data routine invoked by the tradeoff learning system in some embodiments.

FIG. 3 is a flow diagram illustrating a classify_data routine invoked by the tradeoff learning system in some embodiments. The tradeoff learning system can invoke the routine to classify input data. The routine 300 starts at block 302. At block 304, the routine receives input data, such as a novel point that was not in the training data. At block 306, the routine employs the combined classifier to classify the input data. The classification can indicate a side of a hyper-surface corresponding to the combined classifier. At block 308, the routine returns the classification for the input data.

Figure 4:
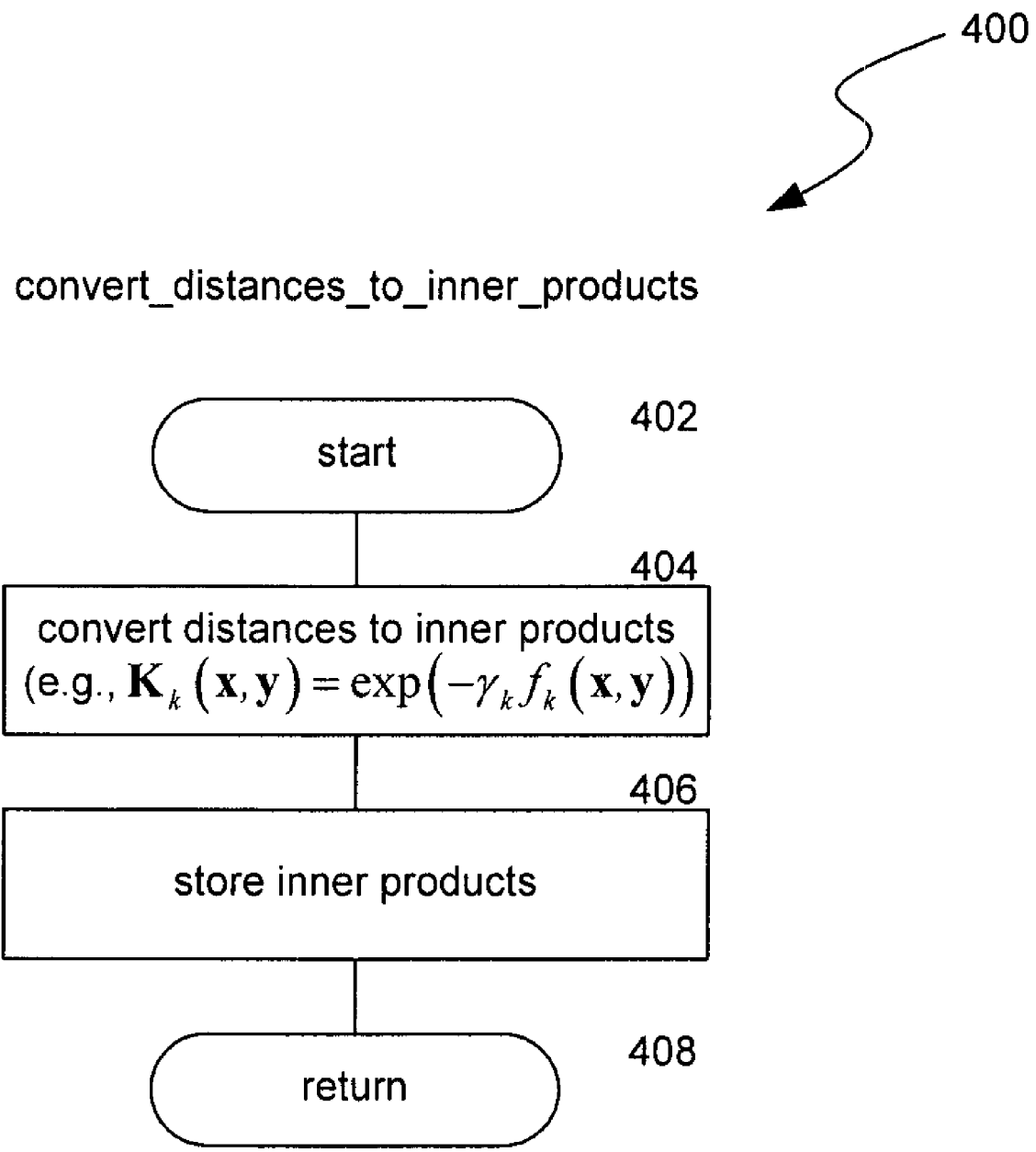
FIG. 4 is a flow diagram illustrating a convert_distances_to_inner_products routine invoked by the tradeoff learning system in some embodiments.

FIG. 4 is a flow diagram illustrating a convert_distances_to_inner_products routine invoked by the tradeoff learning system in some embodiments. The tradeoff learning system can invoke the routine 400 to convert_distances_to_inner products. As an example, the tradeoff learning system can employ the routine when setting the kernel matrices. The routine begins at block 402. At block 404, the routine converts distances to inner products. In various embodiments, the tradeoff learning system can use various computations to convert the distances. At block 406, the routine stores the computed inner products, such as in a matrix. At block 408, the routine returns.

Figure 5:
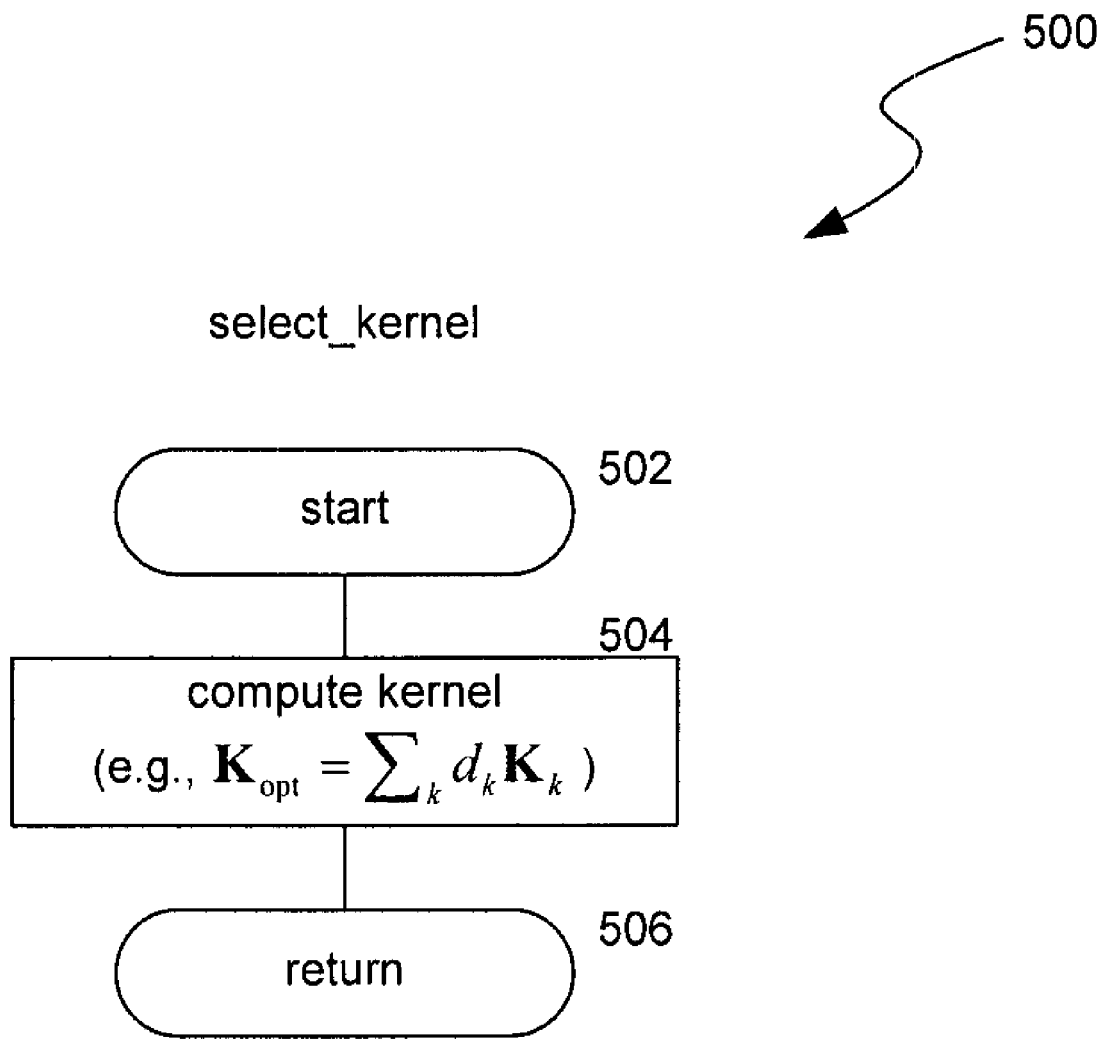
FIG. 5 is a flow diagram illustrating a select_kernel routine invoked by the tradeoff learning system in some embodiments.

FIG. 5 is a flow diagram illustrating a select_kernel routine invoked by the tradeoff learning system in some embodiments. The tradeoff learning system can invoke the routine 500 to select an optimal kernel or a combined kernel. The routine begins at block 502. At block 504, the routine computes a kernel, such as a combined kernel. As an example, the routine computes a selected (e.g., optimal) kernel as a linear combination of a base kernel. In various embodiments, the tradeoff learning system may select a kernel other than the optimal kernel. At block 506, the routine returns.

Figure 6:
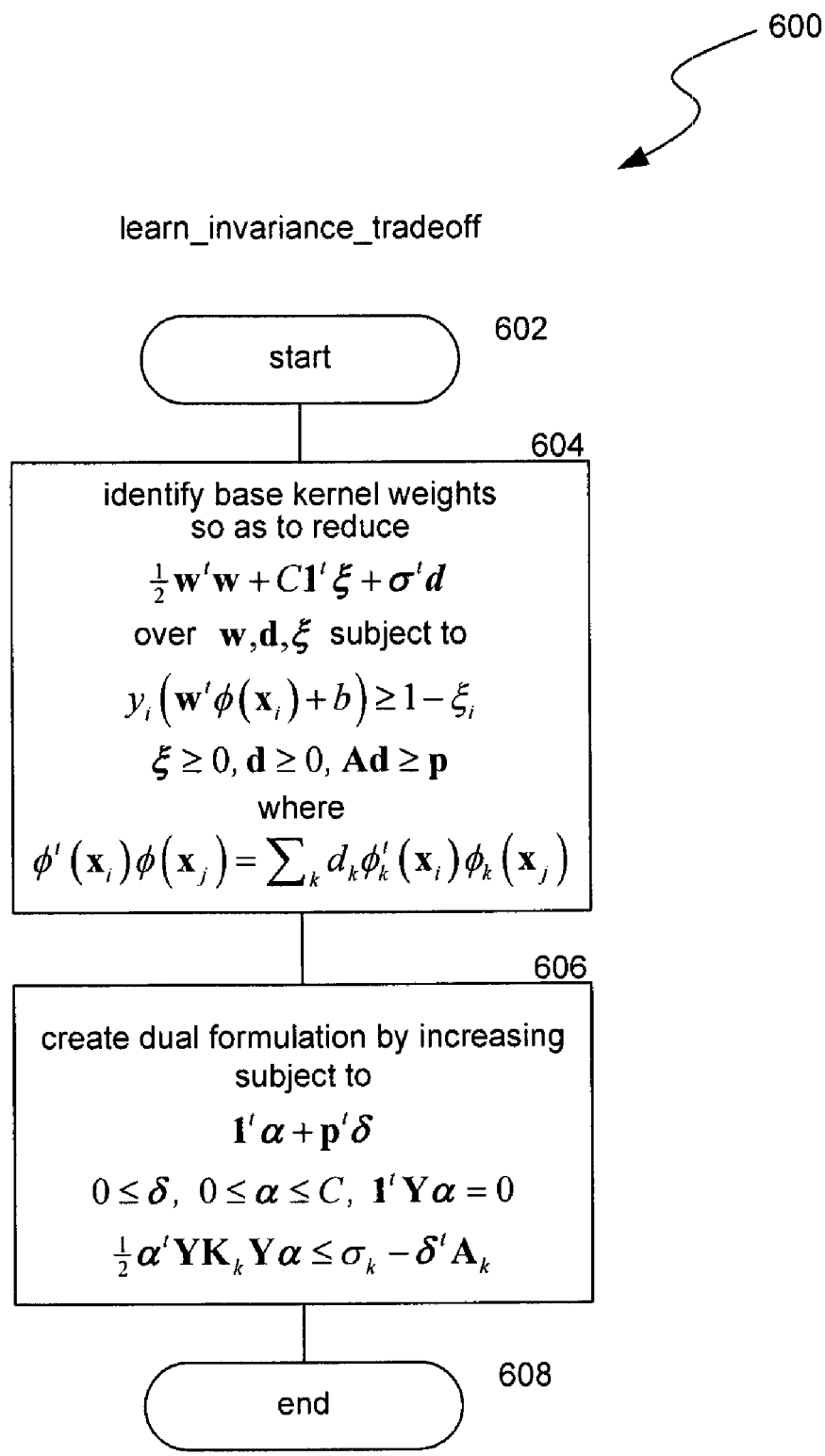
FIG. 6 is a flow diagram illustrating a learn_invariance_tradeoff routine invoked by the tradeoff learning system in some embodiments.

FIG. 6 is a flow diagram illustrating a learn_invariance_tradeoff routine invoked by the tradeoff learning system in some embodiments. The tradeoff learning system can invoke the routine 600 to learn tradeoffs between discriminative power and invariance attributes of classifiers. The routine begins at block 602. At block 604, the routine identifies base kernel weights and decreases the objective function (equation (1), above) subject to various indicated constraints. At block 606, the routine computes a dual formulation subject to a various quadratic inequalities. The routine returns at block 608.

Figure 7:
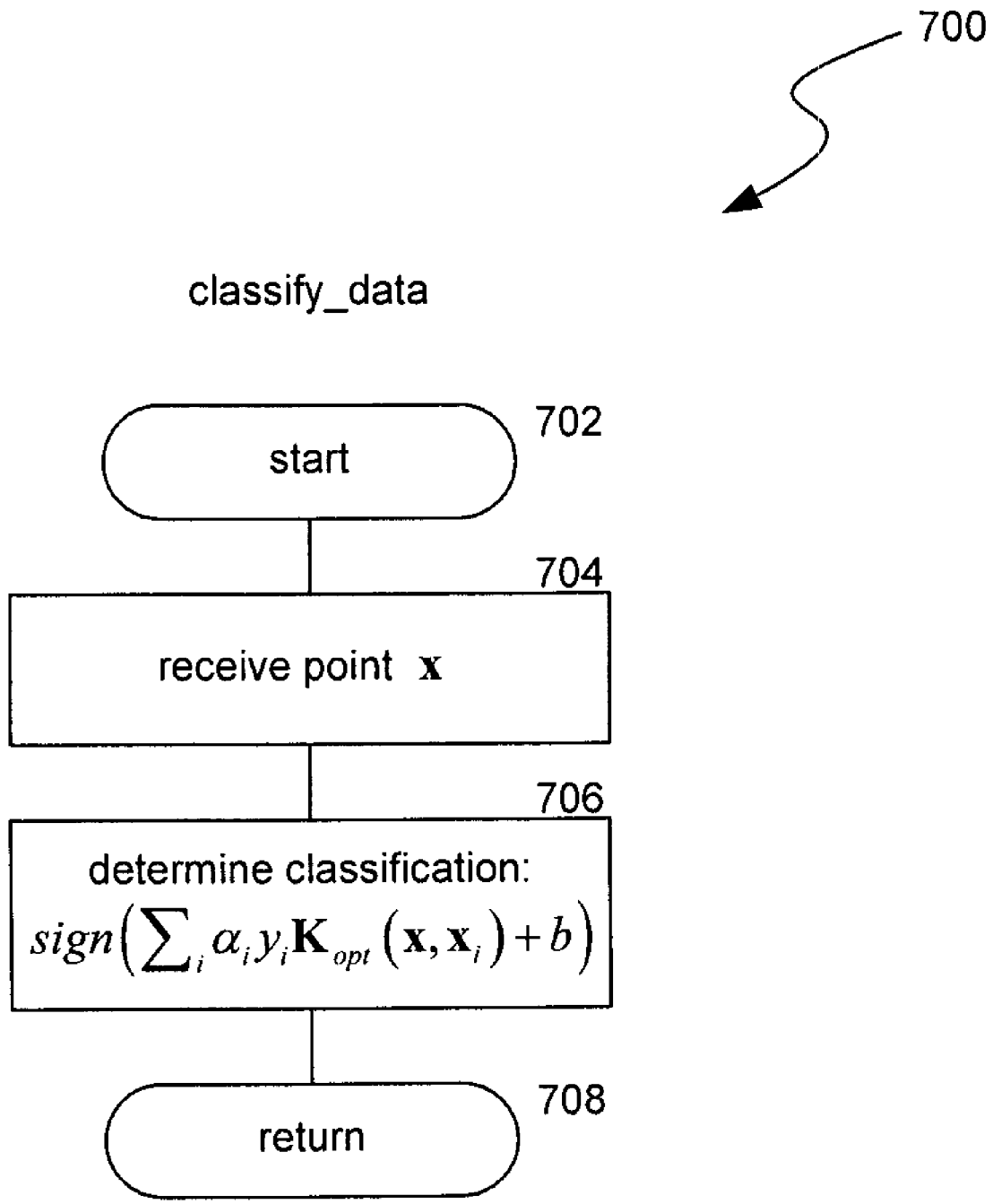
FIG. 7 is a flow diagram illustrating a classify_data routine invoked by the tradeoff learning system in some embodiments.

FIG. 7 is a flow diagram illustrating a classify_data routine invoked by the tradeoff learning system in some embodiments. The classify_data routine of FIG. 7 is a particular embodiment of the general classify_data routine illustrated in FIG. 3 and described above in relation to that figure. The tradeoff learning system can invoke the routine 700 to classify data. The routine begins at block 702. At block 704, the routine receives input data, such as a novel point that does not appear in the training data that was used to generate the base classifiers. At block 706, the routine determines a classification for the received input data, such as based on the sign of the value computed by the combined classifier. At block 708, the routine returns the determined classification (e.g., sign).

In various embodiments, the tradeoff learning system can function to produce effective combined classifiers even in cases where human intuition about the right levels of invariance might fail, such as when combining audio, video, and text.

In various embodiments, the tradeoff learning system can also function effectively with poor, or highly specialized, classifiers. This is again useful in cases when the right levels of invariance are not known and so starting with many base classifiers can be useful. For example, in texture classification, classifiers with scale and no invariance can be included. The individual performance of these base classifiers can be poor. However, when all the base classifiers are weighted equally, the combined performance can fall below the performance of the best base classifier. This problem does not occur with the tradeoff learning system.

Learning the tradeoff between invariance and discriminative power for a given classification task can not only lead to improved classification, but also may provide insights into the nature of the problem being tackled. In addition, knowing how invariances change continuously with varying training set sizes can be used to learn about closely related problems.

In some embodiments, to tackle large scale problems involving hundreds of kernels, the tradeoff learning system can employ a minimax optimization strategy. In this strategy, a primal is reformulated as $\text{Min}_d T(d)$ subject to $d \geq 0$ and $Ad \geq p$, where $$T(d) = \text{Min}_{w,\xi} \frac{1}{2} w^t w + C 1^t \xi + \sigma^t d \quad (8)$$

$$\text{subject to } y_i(w^t \phi(x_i) + b) \geq 1 - \xi_i \quad (9)$$

$$\xi \geq 0 \quad (10)$$

The strategy minimizes T using projected gradient descent via the iteration $d^{n+1} = d^n - \epsilon^n \nabla T$ and ensures that the constraints $d^{n+1} \geq 0$ and $Ad^{n+1} \geq p$ are satisfied. To calculate $\nabla T$, the tradeoff learning system employs the dual of T, which is:

$$W(d) = \text{Max}_\alpha 1^t \alpha + \sigma^t d - \frac{1}{2} \sum_k d_k \alpha^t Y K_k Y \alpha \quad (11)$$

subject to $0 \leq \alpha \leq C, 1^t Y \alpha = 0$ (12)

$$\frac{\partial T}{\partial d_k} = \frac{\partial W}{\partial d_k} = \sigma_k - \frac{1}{2} \alpha^{*t} Y K_k Y \alpha^* \quad (13)$$

The minimax algorithm proceeds in two stages. In the first, d (and therefore $K = \Sigma d_k K_k$) are fixed. Since $\sigma^t d$ is a constant, W is the standard SVM dual with kernel matrix K. Any large scale SVM solver of choice can therefore be used to maximize W and obtain $\alpha^*$. In the second stage, T is minimized by projected gradient descent according to (13). The two stages are repeated until convergence or a maximum number of iterations is reached at which point the weights d and support vectors $\alpha^*$ have been solved for.

A novel point x can now be classified as $\pm 1$ by determining $\text{sign}(\Sigma_i \alpha_i y_i K_{opt}(x, x_i) + b)$. To handle multi-class problems, both 1-vs-1 and 1-vs-All formulations are attempted. For 1-vs-1, the task is divided into pairwise binary classification problems and a novel point is classified by taking the majority vote over classifiers. For 1-vs-All, one classifier is learned per class and a novel point is classified according to its maximal distance from the separating hyperplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for learning tradeoffs between discriminative power and invariance of classifiers, comprising:
   receiving two or more classifiers, each classifier for classifying data and having associated therewith a kernel with corresponding kernel weight, the kernel specifying an attribute for its associated classifier;
   employing a learning technique to produce a combined classifier based on the two or more received classifiers by decreasing a function of the kernel weights to learn tradeoffs between discriminative power and invariance;
   generating by the computing system a base kernel for each of the received two or more classifiers; and
   selecting one of the generated base kernels by solving a convex optimization problem having a linear objective and quadratic inequality constraints.

2. The method of claim 1 wherein the employing the learning technique includes:
   producing a linear combination of the generated base kernels that corresponds to the combined classifier.

3. The method of claim 1, further comprising:
   receiving an input; and
   classifying the received input using the combined classifier to produce a classification for the received input wherein the produced classification produces a smaller Euclidian distance than a Euclidian distance produced by employing any of the received two or more classifiers.

4. The method of claim 1, further comprising determining a proportion in which at least one of the received two or more classifiers should be combined.

5. The method of claim 1 wherein the employing of the learning technique minimizes a first equation subject to a second equation and a third equation, wherein the equations can be expressed as:

$$\underset{w,d,\xi}{\text{Minimize}} \quad \frac{1}{2}w^t w + C1^t\xi + \sigma^t d$$

subject to $y_i(w^t \phi(x_i) + b) \geq 1 - \xi_i$ $\xi \geq 0, d \geq 0, Ad \geq p$ where $\phi^t(x_i)\phi(x_j) = \sum_k d_k \phi_k^t(x_i)\phi_k(x_j)$.

6. The method of claim 1 wherein the employing of the learning technique includes accounting for a preference weight provided by a user.

7. The method of claim 1, further comprising optimizing base kernel weights.

8. The method of claim 1, further comprising determining a minimal set of invariances for the combined classifier.

9. A system for learning tradeoffs between discriminative power and invariance of classifiers, comprising:
  a processor and memory;
  two or more classifiers, each classifier for classifying input and having associated therewith a kernel with a corresponding kernel weight, the kernel specifying an attribute for its associated classifier;
  a tradeoff learning component configured to combine the two or more classifiers to produce a combined classifier by decreasing a function of the kernel weights, wherein each classifier is a support vector machine incorporating a first tradeoff between discriminative power and invariance, and the produced combined classifier incorporates a second tradeoff between discriminative power that is different from the first tradeoff between discriminative power; and
  a classifier component configured to receive an input and classifies the received input using the produced combined classifier.

10. The system of claim 9 wherein the tradeoff learning component employs a dual formulation to produce the combined classifier.

11. The system of claim 9 wherein the tradeoff learning component employs a dual formulation to produce the combined classifier, wherein the dual formulation maximizes:

$$\underset{\alpha, \delta}{\text{Maximize}} \quad 1^t \alpha + p^t \delta.$$

12. The system of claim 9 wherein the tradeoff learning component employs a numerical optimization package to solve a quadratic equation.

13. The system of claim 9 wherein the function of the kernel weights is an objective function.

14. The system of claim wherein the function of the kernel weights can be expressed as:

$$T(d) = \text{Min}_{w,\xi} \frac{1}{2} w^t w + C1^t \xi + \sigma^t d.$$

15. The system of claim 9 wherein the function of the kernel weights is decreased subject to a constraint and the tradeoff learning component computes a dual formulation subject to a quadratic inequality.

16. A computer-readable storage device storing computer-readable instructions that, when executed, perform a method for learning tradeoffs between discriminative power and invariance for classifiers, the method comprising:
  receiving two or more classifiers, each classifier for classifying input and having associated therewith an attribute;
  generating a base kernel for each of the received classifiers, the base kernel specifying a function of the attribute, each base kernel having one or more weights; and
  producing a combined classifier based on at least the generated base kernels wherein the produced combined classifier classifies the input with greater precision than the received classifiers, wherein the combined classifier incorporates a tradeoff between discriminative power and invariance that is different from at least one of the received two or more classifiers.

17. The computer-readable storage device of claim 16 wherein at least one of the two or more classifiers is a support vector machine.

* * * * *

UNITED STATES PATENT AND TRADEMARK OFFICE
CERTIFICATE OF CORRECTION

| | |
|---|---|
| PATENT NO. | : 8,015,131 B2 |
| APPLICATION NO. | : 12/062818 |
| DATED | : September 6, 2011 |
| INVENTOR(S) | : Manik Varma et al. |

It is certified that error appears in the above-identified patent and that said Letters Patent is hereby corrected as shown below:

In column 10, line 11, in Claim 14, delete "claim" and insert -- claim 9 --, therefor.

Signed and Sealed this
Twenty-ninth Day of November, 2011

David J. Kappos
*Director of the United States Patent and Trademark Office*